United States Patent [19]

Suzuki et al.

[11] 4,182,690

[45] Jan. 8, 1980

[54] EMULSION BREAKING MATERIAL

[75] Inventors: Hideaki Suzuki; Tomoyoshi Ono, both of Iwakuni; Wataru Yamamoto, Hiroshima; Masahiro Yamaguchi, Iwakuni, all of Japan

[73] Assignee: Teijin Limited, Osaka, Japan

[21] Appl. No.: 850,517

[22] Filed: Nov. 11, 1977

[30] Foreign Application Priority Data

Nov. 16, 1976 [JP] Japan ................................ 51-136939
Jun. 16, 1977 [JP] Japan ................................. 52-70441
Aug. 19, 1977 [JP] Japan ................................. 52-98717

[51] Int. Cl.$^2$ ............................................. B01D 17/04
[52] U.S. Cl. ................................. 252/358; 252/325; 252/344
[58] Field of Search .................... 252/325, 344, 358

[56] References Cited

U.S. PATENT DOCUMENTS

| | | | |
|---|---|---|---|
| 2,246,842 | 6/1941 | De Groote | 252/344 |
| 2,805,977 | 9/1957 | Robinson et al. | 424/35 X |
| 2,907,717 | 10/1959 | Hann | 252/325 |
| 3,145,146 | 8/1964 | Lieberman et al. | 424/38 X |
| 3,152,196 | 10/1964 | Marziani | 252/325 X |
| 3,697,306 | 10/1972 | Miller | 427/207 R X |

FOREIGN PATENT DOCUMENTS 2632197 2/1977 Fed. Rep. of Germany ........... 252/325

OTHER PUBLICATIONS

Ratchford et al.: J. Org. Chem. 15, 317–325 (1950).
Boenig: "Polyolefins: Structure and Properties", Elsevier Publ. Co., 1966, pp. 160 and 161.
Brown et al.: J. Org. Chem. 12, 160–165 (1947).
Merck Index, Ninth Edit., 1976, pp. 1150, 1152, 1155.
Oxley et al.: J. Chem. Soc., 1946, pp. 147–149.
CA 50, 7501e (1956).
Malm et al.: J. Am. Chem. Soc., 51, pp. 274–278 (1929).
Tetrahedron Letters, 1965 (27), pp. 2269–2271.
Gardner et al.: J. Am. Chem. Soc., 81, pp. 3364–3366 (1959).

*Primary Examiner*—Richard D. Lovering
*Attorney, Agent, or Firm*—Sughrue, Rothwell, Mion, Zinn and Macpeak

[57] ABSTRACT

An emulsion breaking material comprising a substrate and one or more organic compounds closely adhered thereto composed of (A) a hydrophobic part consisting of hydrocarbon groups having a total carbon number of 6 to 60 and (B) a hydrophilic part consisting of at least one functional group containing at least one atom selected from the group of nitrogen, sulfur, and oxygen.

16 Claims, No Drawings

EMULSION BREAKING MATERIAL

BACKGROUND OF THE INVENTION

1. Field of the Invention

This invention relates to an emulsion breaking material applicable to a treatment of an emulsion of emulsifiable compound, especially of an emulsified oil.

2. Description of the Prior Art

Severe social problems have recently been raised about public hazards such as water pollution and sea corruption caused by the waste water containing emulsifiable compounds, especially by the waste water containing animal fats, plant and/or mineral oils.

Among the treatments of the waste water containing said compounds, the removal of an oil component from the waste water containing an emulsified oil, such as an oil emulsified by the addition of surfactant or extremely small oil particles, is very hard when compared to the removal of dispersed oil particles having larger diameters.

The above-described waste water is discharged from factories of various industries such as machinery industry, chemical industry, steel industry, as a matter of course, and food industry, paint industry and textile industry as well.

As a method for the treatment of the waste water containing an emulsified oil, hitherto, there are mentioned electrolytic process; oil-water separation by pressure/foam separation, flocculation precipitation or filtration with an addition of salting-out reagents, flocculating reagents or cohesive reagents; or extraction of oil using solvents.

Every method, however, has some disadvantages, for instance, (a) large scale equipment or time-consuming treatments are required to purify the waste water up to the undetectable concentration of oil.

(b) some of the above-mentioned methods necessitate other subsequent treatments since they are not efficient enough to decrease the oil concentration less than 5 ppm of mineral oils and 30 ppm of animal and plant oils as suggested by the Country's Pollution Control Standards (hereinafter referred to as "CPCS").

Furthermore, there is a method proposed in which amine derivatives liquid at normal temperature or those modified to have an affinity for water as used as emulsion breakers; however, such breakers are only effective when homogeneously mixed with water. The use of a mixing apparatus is essential for this method, and nevertheless, it is difficult to reduce the COD of the waste water by this method, which necessitates the secondary treatment of the waste water with activated charcoal.

For the purpose of improving the disadvantages of these treating methods, some methods have been proposed (for example, refer to Japanese Pat. Laid-open No. 51-79959, and No. 51-120050) in which composite of fibrous substance and inorganic compounds are used as the treating material, but they are also unsatisfactory in the removal of emulsifiable compounds (refer to the comparative example 1 described later). Therefore, the development of a treating material which can treat the emulsifiable compounds practically effectively, easily industrially, has been desired.

SUMMARY OF THE INVENTION

The object of this invention is to provide an excellent emulsion breaking material.

The emulsion breaking material in this invention is obtained by attaching to the substrate at least one of organic compounds comprising a hydrophobic part consisting of one or more hydrocarbon groups of a total carbon number of 6-60, and a hydrophilic part consisting of at least one functional group containing at least one atom selected from the group of nitrogen atom, sulfur atom, and oxygen atom.

DETAILED DESCRIPTION OF THE PREFERRED EMBODIMENTS OF THE INVENTION

The organic compound having hydrophobic hydrocarbon groups (A) and hydrophilic groups (B) containing above-mentioned atoms, which is a component of the treating material of this invention, is to have a total number of carbon atoms in said hydrocarbon groups ranging from 6 to 60, preferably from 10 to 40, more preferably from 12 to 36, especially from 10 to 30.

The nitrogen-containing group is, for example, amino, imido, amido, imino, urethane, urea, amidino, betaine, sulfonamido, hydrazino, hydrazido, and Schiff base, preferably amino, imino, imido, and amido, especially amino.

The sulfur-containing group is, for example, residues of thiourea, thiol, thioether, thioamide, sulfonium salt, and sulfonamide, and the oxygen-containing group is, for example, hydroxyl, carboxyl, ether, urethane, ester, ketone, amide, and aldehyde.

The hydrophobic hydrocarbon groups used in this invention are aliphatic groups such as hexyl, heptyl, octyl, nonyl, decyl, undecyl, dodecyl, oleyl, palmityl, and stearyl groups, aromatic groups such as phenyl and benzyl groups, and alicyclic groups such as cyclohexyl, and cyclooctyl groups. At most three of these hydrophobic groups can be combined with a nitrogen-containing group to form a tertiary amine, or with a group such as —SO$_2$.N.

Even if the number of carbon atoms of each hydrophobic group is small, the sum of these might amount to a very large number. In the present invention, the total number of the carbon atoms is limited not to exceed 60.

In the above groups, amino, imino, sulfonamido, and hydrazido groups are preferable for the nitrogen-containing group, thiourea residue, thiol residue and sulfonamide group are preferable for the sulfur-containing group, and hydroxyl, carboxyl, and urethane groups are preferable for the oxygen-containing group. For the hydrophobic hydrocarbon group, octyl, nonyl, decyl, undecyl, dodecyl, oleyl, palmityl, and stearyl groups are preferable.

Examples of the organic compounds having the above groups are given below.

(a) The compound having nitrogen-containing hydrophilic groups are, for example; primary amines such as hexylamine, heptylamine, octylamine, nonylamine, decylamine, laurylamine, myristylamine, palmitylamine, oleylamine, and stearylamine, diamines and triamines having the above hydrocarbon chains, their picrate, salts (for examples, salt of hydrochloric acid, sulfuric acid, phosphoric acid, carbonic acid, and acetic acid), acid amides, amidines, ureas and thioureas of the primary amines and the secondary amines having said hydrocarbon chains, and Schiff base of the primary amines. The preferable amides are stearyl amide and N-stearyl acetamide. The quaternary ammonium salts and betaines having said hydrocarbon chains are also useful. Polyamines such as stearyl propylene diamine and semi-hardened tallow diamine can also be used. The use of a mixture of amines having hydrocarbon chains of different carbon numbers such as hardened tallow amine and coconut amine is also possible. The nitrogen-containing organic compound (for example amines) can be preferably used so long as it is solid in the state of mixture regardless of whether one of its individual components is not solid at normal temperature. In the above compounds, lauryl amine, myristyl amine, palmityl amine, oleyl amine, stearyl amide, hardened tallow amine, and coconut amine are especially preferable.

(b) The compounds having sulfur-containing hydrophilic groups are, for example, N-alkylthiourea, higher fatty acid mercaptan, thioglycolstearyl, N-stearylthioacetamide and N-stearyl-p-toluene sulfonamide. In the above compounds, N-alkylthiourea, higher fatty acid mercaptan, and N-stearyl-p-toluene sulfonamide are preferable.

(c) The compounds having oxygen-containing hydrophilic groups are for example; hydroxyl-containing compounds such as stearyl alcohol, stearyl hydroxyethylamine, p-octylphenol and 3,5-dibutyl-4-hydroxytoluene; aliphatic saturated monocarboxylic acids having a carbon number of from 10 to 30, for example, capric acid, undecylic acid, lauric acid, tridecylic acid, myristic acid, pentadecylic acid, palmitic acid, hetadecylic acid, stearic acid, nonadecanoic acid, arachic acid, behenic acid, lignoceric acid, cerotic acid and melissic acid; aliphatic unsaturated monocarboxylic acids having a carbon number of from 10 to 30, for example, oleic acid, linoleic acid, linolenic acid, elaidic acid, stearolic acid, cetoleic acid, erucic acid and brassidic acid; aliphatic dicarboxylic acids having a carbon number of from 10 to 30, for example, sebacic acid, brassylic acid; and compounds having groups such as diglyceride or triglyceride of fatty acid. In the above oxygen-containing compounds, p-octylphenol, 3,5-dibutyl-4-hydroxytoluene, stearic acid, oleic acid, linoleic acid, and linolenic acid are preferable.

The organic compounds of the treating material of this invention is preferably solid at 25° C. A compound which is non-solid at 25° C. may also be preferably used provided that the compound changes to a solid by the incorporation (for example, by mixing) with other compounds. The above organic compounds can be used either singly or in a combination thereof.

In the above organic compounds, the organic compounds having nitrogen-containing hydrophilic groups, especially aliphatic amines such as stearylamine are effective for the breaking of the emulsion containing anion surfactants, and the organic compounds having sulfur-containing hydrophilic groups or phenolic -OH groups are effective for the breaking of the emulsion containing nonionic surfactants. And the organic compounds having oxygen-containing hydrophilic groups, especially carboxylic groups, are effective for the breaking of the emulsion containing cationic surfactants.

The organic compounds in the present invention comprises those that have the above-mentioned hydrophobic hydrocarbon groups and the hydrophilic groups (or their derivatives) and any other atoms introduced in their structure or inorganic salts of these compounds provided that those modifications do not reduce the performances of the treating material of this invention.

The treating material of this invention is a closely combined composite composed of the above compounds and a substrate for supporting thereof, and there is no particular limitations to the types and shapes of the substrate.

Water-insoluble inorganic materials and organic materials are used as the substrate. Examples of the inorganic materials are silica, alumina, molecular sieves, zeolite, activated charcoal, diatomaceous earth, sand, activated clay, asbestos, glass fiber, and grass peat, and as for the organic materials, natural or synthetic polymers are used.

Any type of the natural or synthetic polymers may be used so long as they are insoluble in water. Examples of the natural polymers are cellulose, wool, and silk. Modifications of natural polymers, such as acetylcellulose, nitrocellulose, methyl cellulose, ethyl cellulose, and carboxymethyl cellulose, may also be used. The synthetic polymers are homopolymers and copolymers of two or more of the monomers, for example, styrene derivatives such as styrene, α-methylstyrene, and divinyl benzene; acrylic acid derivatives such as acrylic acid, methacrylic acid, methyl methacrylate, ethyl acrylate, butyl acrylate, acrylamide, and methacrylamide; ethylenic unsaturated monomers such as ethylene, propylene, butylene, vinyl acetate, vinyl chloride, vinylidene chloride, acrylonitrile, and methacrylonitrile; and diene monomers such as butadiene, isoprene, and chloroprene. Condensation or addition polymers such as polyurethane, polyurea, polyethylene terephthalate, polyethylene naphthalate, polybutylene terephthalate, nylon, aromatic polyamides, polycarbonate, polyphenylene oxide, polysulfone, and polyether sulfone may also be used. It is also possible to use the blend of two or more of the above polymers.

Furthermore, thermosetting resins such as phenolic resin, epoxy resin, phenolic-epoxy resin, amino resin, and petroleum resin may also be used.

The shape of the substrates used for the treating materials of this invention are not limited; however, shapes to give a larger surface area by a close combination with any of the aforementioned organic compounds are desirable. Examples of such shapes are, granules, chips, flakes, sponges, ribbons, and fibrous shapes such as fibril, filament, staple fiber, web, mat, woven fabrics, and non-woven fabrics. Though the fibrous substrates generally lack the capability of treating the emulsified compounds without assistance, it is especially preferable to use the fibrous substrate for the purpose of this invention, because of its capability of coagulating the suspended oil particles of rather large diameter together with the emulsion breaking capability of the organic compounds of this invention.

Natural or synthetic fibers of arbitrary deniers manufactured by the melt spinning, dry spinning, or wet spinning of polymers, mixed fibers made of the above fibers, fibrous materials manufactured by molding polymers into a film followed by slitting of the film by an arbitrary method, net-like fibrous material manufactured by the unidirectional drawing of extrudate obtained by the extrusion of polymers containing a foaming agent (for example nitrogen gas) through a slit die, composite fibers composed of two or more polymers, or other fibrous materials formed by an arbitrary method, can be used as the fibrous materials of this invention.

The diameter of the fiber is usually less than 1,000 denier, preferably less than 100 denier, especially from 0.1 to 50 denier. Therefore, the net-like fibrous material made of foamable material is especially preferable among the above-mentioned fibrous materials because of its small (average) diameter.

The treating materials of this invention for the emulsifiable compounds can be manufactured, for example, by the methods described below. The method for adhering the organic compound of this invention, which is a component of the treating material, has no particular limitations and, for example, a solution of said organic compound in a solvent is put into contact with the substrate and the solvent is evaporated to dryness, thereby closely adhering said organic compound to the substrate. Generally, the contact of said solution with said substrate is carried out by the dipping process which comprises dipping the substrate into the solution, but other methods, such as spraying of the mist of said solution onto said substrate, and continuous transferring of said substrate in the shower of said solution, may also be used. Furthermore, a method which comprises covering the substrate with said organic compound, which is a component of the treating material of this invention, by making the formed substrate contact a molten organic compound, and cooling the compound to solidify and stick the covering layer to the substrate; a method which comprises melting and mixing said organic compound and polymer, and forming the molten mixture to a composite material; and a method which comprises dissolving said organic compound together with the polymer in a solvent to form a homogeneous solution, and forming the solution while evaporating the solvent therefrom, are also applicable. The use of an adhesive and the incorporation of other additives in the manufacture of the composite are effective to attain the sufficient adhesivity between the substrate and said compounds.

The organic compound, which is a component of the treating material of this invention, is desirably water-insoluble, to prevent the loss of the effective components necessary for the removal of the emulsifiable compounds dispersed in the water, which is the principal purpose of the treating material of this invention, by being dissolved into the water and washed out. Furthermore, the organic compound is desirably solid at normal temperature to prevent the loss of the effective components in the treating process.

The organic compound used in this invention has both the hydrophobic hydrocarbon groups and the hydrophilic groups in one molecule. In the present invention, it is considered that the hydrophobic part and the hydrophilic part of the compound, when held in balance produce an adequate effect on the emulsion particles; thus the particles are adsorbed by the compound, and there they associated with each other to form coarser particles, thus breaking the emulsion. In general, an organic compound having carbon atoms less than 6 is considered to have an insufficient effect of adsorbing and breaking emulsion particles, because the ratio of the hydrophobic part in the compound is too low to give the adequately balanced hydrophobic and hydrophilic properties to the emulsion particles. On the other hand, an organic compound having carbon atoms more than 60 is considered not to give the adequate affinity for the emulsion particles because of its too high hydrophobic ratio.

The emulsifiable compound, which is the target of the treating material of this invention, is a compound having emulsifiable characteristics in an liquid medium (usually water), usually existing in the form of an emulsified oil (for example, animal, plant or mineral oil). But the emulsifiable compound of this invention also includes free oil or a compound which is not called by the name of oil, provided that they are emulsifiable under proper circumstances, for example, in the presence of surface active agents.

The essential characteristics of the treating material of this invention are its ability to make fine oil particles grown larger and break the emulsion.

The emulsion treating material produced according to this invention is effective on the removal of an emulsified oil composed of mineral, animal or plant oil.

For example, drain from compressors, waste water containing a cutting oil and a surfactant, waste washing water from rolled steel mills or waste water from car washing can be treated and the emulsified oil therein can be removed effectively.

The excellent characteristics of this treating material are that even the emulsified oil containing a nonion nonionic surfactant, which is considered difficult to treat after conventional methods, can be treated effectively and COD components can be removed effectively along with oil component.

The invention will be illustrated more specifically by the following Examples in which all parts percentages (%) and parts per million (ppm) are by weight.

The "oil concentration" was measured and determined as described below unless otherwise stated.

The TOD (Total Oxygen Demand) was measured by YUASA IONICS TOD Automatic Analyzer Type 225.

Oil concentration

The oil concentration (ppm) was calculated from the amount of oil (mg) contained in 1 kg of the waste water measured by the following "n-hexane extraction method of JIS (Japan Industrial Standards) K-0102".

n-Hexane extraction method

The sample (waste water in this case) was adjusted to a pH of less than 4.0, and contacted with n-hexane.

The n-hexane phase, after separated from the water phase, was evaporated to remove n-hexane.

The residue thus obtained was hydrocarbon, its derivatives, grease and/or other oily substances.

This is the oily substance contained in the waste water.

EXAMPLE 1

Nitrogen gas was introduced under a pressure of 15 Kg/cm$^2$ into molten polypropylene at a temperature of about 200° C. in an extruder, and it was thoroughly kneaded. The mixture was extruded from a die through a slit with a clearance of 0.225 mm and a width of 150 mm, and at the die exit, cooling air of about 20° C. was blown aginst the extruded, molten polymer mixture. Thus the extrudate was quenched to 55° C. and then withdrawn at a draft ratio of 150 and wound up. Then, 40 such wound-up sheets were laminated, opened in the transverse direction at an opening ratio of 10 times, and integrated by passing through, a roller press with a pressure of 40 kg/cm$^2$. Thus a sheetlike fibrous material having a reticulate fibrous structure was obtained.

This fibrous material, 2.5 grams in weight, was dipped in a methylene chloride solution containing 10% of stearylamine and 1% of an epoxy resin having a molecular weight of about 1,400 at room temperature for about one minute, and squeezed a little, then the solvent was evaporated to dryness to give 4.83 grams of a composite material in which the fibrous material (substrate) and the organic material were closely united. A 14-mm diameter glass column was filled with 4.83 grams of this fibrous material, and the waste water containing 300 ppm of emulsified oil (particle diameter; 1 to 10μ) of cutting oil ("KUTWELL" made by ESSO Petroleum Oil Co. Ltd.) was let pass through the column at a flow rate of 10 ml/minute (SV≈25).

The oil concentration of the treated waste water was measured at predetermined intervals by the n-hexane extraction method.

The results are shown in Table 1.

TABLE 1

| Amount treated (liter) | Oil Concentration of treated waste water (ppm) |
|---|---|
| 10 | <1.0 |
| 11–18 | 1.0–2.0 |
| 19–25 | 2.0–5.0 |
| 26–32 | 5.0–10.0 |
| 33–40 | 10.0–30.0 |

EXAMPLE 2

A commercially available web of fibrous polypropylene (6 denier×70 mm), 2.5 grams in weight, was dipped in a methylene chloride solution containing 10% of a hardened beef tallow amine and 1% of an epoxy resin having a molecular weight of about 1,400 at room temperature for one minute, and squeezed a little, then the solvent was evaporated to dryness to give 4.75 grams of a composite material.

A 14-mm diameter glass column was filled with the total amount of the said composite material, and the waste water containing 300 ppm of cutting oil ("KUTWELL 40" made by ESSO Petroleum Oil Co. Ltd.) was let pass through the column at a flow rate of 10 ml/minute (SV≈40).

The oil concentration of the effluent water was measured by the n-hexane extraction method, and the following results were obtained.

TABLE 2

| Amount treated (liter) | Oil Concentration of treated waste water (ppm) |
|---|---|
| 7 | <1.0 |
| 8–12 | 1.0–2.0 |
| 13–18 | 2.0–5.0 |
| 19–24 | 5.0–10.0 |
| 25–30 | 10.0–30.0 |

EXAMPLE 3

A commercially available web of fibrous polypropylene (6 denier×70 mm) weighing 2.5 grams was treated in the same way as in Example 1 to give 5.93 grams of a fibrous composite material. A 14-mm diameter glass column was filled with the total amount of the said composite material with 2.0 grams of an oil adsorbent "Olsorb" made by Teijin Limited placed thereunder.

Three columns were prepared in the same way, and the waste water containing 300 ppm of the cutting oil ("KUTWELL 40" made by ESSO Petroleum Oil Co. Ltd.), the waste water containing 300 ppm of cutting oil ("CIMIRON EP-11" containing a nonionic surface active agent, made by DAIDO CHEMICAL INDUSTRY) and the compressor drain containing 330 ppm of an oil were let pass through the respective columns.

The oil concentrations of the waste water and compressor drain thus treated were measured, and the results are shown in Table 3.

TABLE 3

| | KUTWELL 40 | | CIMERON EP-11 | | Compressor drain |
|---|---|---|---|---|---|
| Amount treated (l) | Oil concentration (ppm) | TOD (ppm) | Oil concentration (ppm) | TOD (ppm) | Oil concentration (ppm) |
| Untreated water | 300 | 695 | 300 | 700 | 330 |
| 0–10 | 0 | 5.0–15.0 | <1.0 | 5.0–10.0 | 0 |
| 11–20 | 0 | 5.0–15.0 | 1.0–2.0 | 5.0–10.0 | 0 |
| 21–30 | 1.0–2.0 | 10.0–15.0 | 2.0–3.0 | 8.0–10.0 | 1.0–2.0 |
| 31–35 | 2.0–3.5 | 15.0–2.0 | 3.0–5.0 | 8.0–15.0 | 2.0–3.0 |
| 36–40 | 3.5–5.0 | 20.0–25.0 | 5.0–10.0 | 10.0–20.0 | 3.0–5.0 |
| 41–50 | 5.0–20.0 | 25.0–30.0 | 10.0–28.0 | 15.0–40.0 | 5.0–15.0 |

EXAMPLE 4

A commercially available web of fibrous polypropylene (6 denier33 70 mm), 2.5 grams in weight, was let contact distearylamine quickly, and thin coating layers of the distearylamine were formed on the surface of said fibrous substrate to give 4.6 grams of a fibrous composite material.

A 14-mm diameter glass column was filled with the total amount of the said composite material, and the waste water containing 300 ppm of cutting oil ("KUTWELL 40" made by ESSO Petroleum Oil Co. Ltd.) was let pass through the column at a flow rate of 10 ml/minute.

The sum of 15 l of the waste water was treated to give the treated water containing 10 ppm of the oil.

EXAMPLE 5

A web of polyethylene terephthalate (12 denier×60 mm) weighing 2.5 grams was treated in the same way as in Example 1, and 4.75 grams of a fibrous composite material was obtained.

A 14-mm diameter glass column was filled with the total amount of said composite material. Tow columns were prepared in the same way, and the waste water containing 300 ppm of cutting oil ("KUTWELL 40" made by ESSO Petroleum Oil Co. Ltd.), and the waste water containing 300 ppm of cutting oil ("CIMIRON EP-11" containing a nonionic surface active agent made by DAIDO CHEMICAL INDUSTRY) were let pass through the respective columns at a flow rate of 10 ml/minute.

The oil concentrations of the treated waste water were measured, and the results are shown in Table 4.

TABLE 4

| Amount treated (l) | Oil concentration of treated waste water containing KUTWELL 40 (ppm) | Oil concentration of treated waste water containing CIMERON EP-11 (ppm) |
|---|---|---|
| 3 | <1.0 | 1.0–2.0 |
| 4–6 | 1.0–2.0 | 2.0–4.0 |
| 7–10 | 2.0–5.0 | 4.0–7.0 |
| 11–15 | 5.0–20.0 | 7.0–25.0 |
| 16–20 | 20.0–50.0 | 25.0–65.0 |

EXAMPLE 6

A nonwoven web of "CASHMILON" (6 denier×64 mm), made by Asahi Chemical Industry Co., Ltd., weighing 2.5 grams was treated in the same way as in Example 1 to give 4.65 grams of a fibrous composite material.

A 14-mm diameter glass column was filled with the total amount of the said composite material, and the waste water containing 300 ppm of cutting oil ("KUTWELL 40" made by ESSO Petroleum Oil Co. Ltd.) was let pass through the column at a flow rate of 10 ml/minute, and the following results were obtained.

TABLE 5

| Amount treated (l) | Oil Concentration of treated waste water (ppm) |
|---|---|
| 5 | 1.0–2.0 |
| 6–10 | 2.0–5.0 |
| 11–15 | 5.0–10.0 |
| 16–20 | 10.0–26.0 |
| 21–25 | 26.0–40.0 |

EXAMPLE 7

A commercially available web of rayon (3 denier×51 mm) weighing 2.5 grams was dipped in a methylene chloride solution containing 1% of novolak type phenolic resin and 10% of stearylamine at room temperature for about one minute, and squeezed a little, then the solvent was evaporated to dryness to give 4.1 grams of a fibrous composite material.

A 14-mm glass column was filled with the total amount of the said composite material, and the waste water containing 300 ppm of the cutting oil ("KUTWELL 40" made by ESSO Petroleum Oil Co. Ltd.) was let pass through the column at a flow rate of 10 ml/minute. The oil concentration of the effluent waste water from the column was 0 ppm up to the first 2 liters, but the treated water containing 5.0 ppm of the oil was obtained after the treatment of 15 liters of the waste water.

EXAMPLE 8

Commercially available glass fibers weighing 2.5 grams was treated in the same way as in Example 1 to give 3.5 grams of a fibrous composite material.

A 14-mm diameter glass column was filled with the total amount of the said composite material, and a waste water containing 300 ppm of cutting oil ("KUTWELL 40" made by ESSO Petroleum Oil Co. Ltd.) was let pass through the column at a flow rate of 10 ml/minute. The oil concentration of the effluent water from the column was 5.5 ppm.

EXAMPLE 9

Phenolic resin fibers "KYNOL" made by Kanebo, Ltd. (3 denier×68 mm), 2.5 grams in weight, was treated in the same way as in Example 1 to give 5.4 grams of a fibrous composite material.

A 14-mm diameter glass column was filled with the total amount of the said composite material, and the waste water containing 300 ppm of cutting oil ("KUTWELL 40" made by ESSO Petroleum Oil Co. Ltd.) was let pass through the column at a flow rate of 10 ml/minute, and the treated water containing 4.5 ppm of the oil was obtained after the treatment of 20 liters of the waste water.

EXAMPLE 10

Thirteen grams of a granular molecular sieve (a diameter of 2 mm) was dipped in a molten stearylamine at 80° C., and separated and cooled to give 15 grams of a composite material having a coating layer of stearylamine.

A 14-mm diameter glass column was filled with the total amount of the said composite material, and the waste water containing 300 ppm of cutting oil ("KUTWELL 40" made by ESSO Petroleum Oil Co. Ltd.) was let pass through the column at a flow rate of 10 ml/minute.

The treated water containing 20 ppm of the oil was obtained after the treatment of 10 liters of the waste water.

COMPARATIVE EXAMPLE 1

A fine composite material, 2.5 grams in weight, consisting of fibrillated material, about 5μ in diameter and 15 mm in length, consisting of 20 parts of polyethylene and 80 parts of magnesium oxide powder was obtained in accordance with the method of the Japanese Patent Application Laid-open No. 79959/1976.

A 14-mm diameter glass column was filled with the said material and the waste water containing 300 ppm of an emulsified cutting oil ("KUTWELL 40" made by ESSO Petroleum Oil Co. Ltd.) was passed through the said column at a flow rate of 10 ml/minute.

The oil concentration of the treated water flowed out of the column was measured by the n-hexane extraction method, and the following results were obtained.

TABLE 6

| Amount treated (l) | Oil Concentration of treated waste water (ppm) |
|---|---|
| 1.0 | 200 |
| 2.0–4.0 | 250 |
| 5.0 | 300 |

As shown in the above table, the composite material consisting of the inorganic material has only very little effect in removing the emulsified oil.

EXAMPLE 11

A fibrous material of polypropylene having a fibrous net-like structure was obtained in the same way as in Example 1.

Two grams of the fibrous material of polypropylene was dipped in a chloroform solution containing 5% of stearic acid and 0.5% of polystyrene as an adhesive to improve the binding effect of the fatty acid to the substrate at room temperature for about one minute, and squeezed a little, then the solvent (chloroform) was evaporated to dryness to give 5.2 grams of a composite material in which the fibrous base material as a substrate and the stearic acid were united.

A 14-mm diameter glass column was filled with 5.2 grams of said fibrous material, and emulsified water containing 100 ppm of a machine oil and 20 ppm of distearyldimethylammonium chloride in the form of droplet ranging from 1 to 10μ in size was passed through the column at a flow rate 10 ml/minute (SV≈25), and the oil concentration of the effluent water coming out of the column was measured. The results are shown in Table 7.

TABLE 7

| Amount treated (l) | Oil Concentration of treated waste water (ppm) |
|---|---|
| 0–8 | <1.0 |
| 9–15 | 1.0–2.0 |
| 16–20 | 2.0–5.0 |
| 21–25 | 5.0–10.0 |
| 26–30 | 10.0–20.0 |

EXAMPLE 12

Two grams of a commercially available nonwoven web of polypropylene (6 denier×70 mm) was treated with a chloroform solution containing 5% of stearic acid and 0.5% of polystyrene in the same way as in Example 11, and dried to give 4.8 grams of a composite material (treating material).

A 14-mm diameter glass column was filled with 4.8 grams of said material for treating the emulsified oil waste water, and the emulsified waste water containing 100 ppm of machine oil and 20 ppm of distearyldimethylammonium chloride was passed through the said column at a flow rate of 10 ml/minute (SV≈25), and the oil concentration of the effluent water from the column was measured. The results are shown in Table 8.

TABLE 8

| Amount treated (l) | Oil Concentration of treated waste water (ppm) |
|---|---|
| 0–6 | <1.0 |
| 7–10 | 1.0–2.0 |
| 11–15 | 2.0–5.0 |
| 16–20 | 5.0–10.0 |
| 21–24 | 10.0–20.0 |

EXAMPLE 13

Two grams of a nonwoven web of polyethylene terephthalate fibers (12 denier×60 mm) was dipped in a chloroform solution containing 5% of lauric acid and 0.5% of an epoxy resin having a molecular weight of about 1,400 at room temperature for one minute, and squeezed a little, and then the solvent was evaporated to dryness to give 4.5 grams of a fibrous composite material (treating material).

A 14-mm diameter glass column was filled with the total amount of the said composite material, and the emulsified waste water containing 100 ppm of soybean oil and 20 ppm of stearyltrimethylammonium chloride was passed through the said column at a flow rate of 10 ml/minute (SV≈25), and the oil concentration of the effluent waste water from the column was measured. The results are shown in Table 9.

TABLE 9

| Amount treated (l) | Oil Concentration of treated waste water (ppm) |
|---|---|
| 0–5 | 1.0–2.0 |
| 6–10 | 2.0–5.0 |
| 11–14 | 5.0–10.0 |
| 15–18 | 10.0–20.0 |
| 19–22 | 20.0–30.0 |

EXAMPLE 14

Two grams of a nonwoven web of polyacrylonitrile fibers (6 denier×64 mm) was dipped in a chloroform solution containing 5% of capric acid and 0.5% of polystyrene at room temperature for one minute, and the solvent was evaporated to dryness to give 4.5 grams of a fibrous composite material (treating material).

A 14-mm diameter glass column was filled with the total amount of the said composite material, and the waste water containing 100 ppm of machine oil and 20 ppm of polyoxyethylene stearylamine was passed through the said column at a flow rate of 10 ml/minute (SV≈25), and the treated water containing 5.5 ppm of the oil was obtained.

EXAMPLE 15

Two grams of a commercially available nonwoven web of rayon (3 denier×51 mm) was dipped in a chloroform solution containing 5% of palmitic acid and 0.5% of an epoxy resin having a molecular weight of 1,400 at room temperature for one minute, and squeezed a little, then the solvent was evaporated to dryness to give 5.0 grams of a fibrous composite material (treating material).

The total amount of the said composite material was packed in a 14-mm diameter glass column, through which a waste water containing 100 ppm of a machine oil and 20 ppm of lauryltrimethylammonium chloride was passed at a flow rate of 10 ml/minute (SV≈25), and the treated water containing 2.0 ppm of the oil was obtained.

EXAMPLE 16

Nitrogen gas was introduced under pressure of 15 kg/cm² into a molten polypropylene at a temperature of about 250° C. in the extruder.

After thorough kneading, the mixture was extruded from the die through a slit of 0.225 mm×150 mm. Thus, the extrudate was drawn at 55° C. was taken up into 300-m rolls at a speed of 40 m/minute.

The five bobbins onto which the fibrous materials were thus wound were placed on a bobbin creel to be unwound and passed through rolls to give a five-ply laminated sheet, then dipped in the dipping bath containing a solution consisting of 10% of stearylamine and 2% of polystyrene in methylene chloride kept at 25° C., and squeezed a little with squeezing rollers, then passed through a ventilation chamber through which air heated at 60° C. was flowing to evaporate the solvent to dryness.

Then, compressed air of 1.5 kg/cm² was blown upon the laminated fibrous material from a nozzle reciprocating in the direction perpendicular to the machine direction to open the fibers once adhered together, and the fibrous material was wound on a bobbin.

The column-1, 75 mm in diameter, filled with 34.5 grams of the fibrous treating material, and the column- 2, 75 mm in diameter, filled with 50 grams of the oil adsorbent "Olsorb" of a nonwoven polystyrene fabric, product of Teijin Limited, were connected in series in the order mentioned.

Water containing a fixed amount of emulsified cutting oil ("KUTWELL 40" made by ESSO Petroleum Oil Co.Ltd.) was passed through the said columns at various flow rates, and the oil concentration after passing through the column-1 and that after passing through the column-2 were measured respectively.

The oil concentration after the column-2 was approximately 0 ppm.

The results are shown in Table 10. The throughput capacity of the column-1 was 830 l of water containing the emulsified oil concentration of 100 ppm.

The emulsified oil concentration was determined by means of a turbidimeter made by Nippon Seimitsu Kogaku Co., Ltd.

TABLE 10

| Oil concentration of untreated oil (ppm) | Flow rate (ml/minute) | Oil concentration after the columnn-1 (ppm) | Oil concentration after the column-1 and column-2 (ppm) |
|---|---|---|---|
| 100 | 90 | 1 | 0 |
|  | 210 | 2-3 | 0 |
|  | 420 | 40 | 0 |
|  | 580 | 90-100 | 0 |
| 200 | 80 | 90 | 0-1 |
|  | 280 | 200 | 0 |
|  | 430 | 200 | 0 |
|  | 600 | 200 | 0 |
| 300 | 150 | 30-35 | 0 |
|  | 200 | 70-80 | 0 |
|  | 350 | 200 | 0 |
|  | 550 | 200-300 | 0 |
| 400 | 140 | 300 | 0 |
|  | 240 | 300 | 0 |
|  | 410 | 300-400 | 0 |
|  | 550 | 300-400 | 0 |

EXAMPLE 17

A commercially available polypropylene web (6 denier×70 mm) weighing 2.5 grams was dipped in the methylene chloride solution containing 10% of hardened tallow amine and 1% of epoxy resin having a molecular weight of about 1400 at room temperature for 1 minute, and after the light squeezing of the web, the solvent was evaporated to dryness and 4.8 grams of fibrous composite was obtained.

The composite was wholly packed into a column having a diameter of 14 mm (hereinafter called column-1) and 5.0 grams of "Olsorb" (trade name; product of Teijin Limited), nonwoven polypropylene fabric, was packed into another column hving a diameter of 14 mm (hereinafter called column-2).

Water containing 100 ppm of cutting oil ("KUTWELL 40"; product of Esso Petroleum Oil Co.,Ltd.) in the form of emulsion was passed through in the order of the column-1 and column-2 at a flow rate of 20 ml/minute. The concentrations of the emulsified oil in the treated water sampled from the downstream of the column-1 and that of the column-2 were measured by a turbidimeter. The water treated with column-1 was opaque white and contained 70 ppm of oil, while the concentration of oil in the water after passing through the column-2 was 0 ppm measured by the turbidimeter and 0.5 ppm measured by the n-hexane extraction method of JIS K-0102.

EXAMPLE 18

A web of polyester fiber made by Teijin Limited (12 denier×60 mm), 2.5 grams in weight, was dipped in a chloroform solution containing 10% of p-toluenesulfonyl-N-stearyl amide and 2% of polystyrene at room temperature for 1 minute, and after the light squeezing of the web, the solvent was evaporated to dryness and 5.2 grams of fibrous composite was obtained.

The composite was wholly packed into a column having a diameter of 14 mm (hereinafter called column-1), and 5.0 grams of "Olsorb" (trade name), a nonwoven oil adsorbing materials made of polypropylene/polystyrene blended fiber, was packed in another column having a diameter of 14 mm (hereinafter called column-2).

Water containing 200 ppm of machine oil and 40 ppm of polyoxyethylenenonylphenol ether (n=10) in the form of emulsion in which a diameter of the oil droplets was less than 10$\mu$, was passed through in the order of the column-1 and column-2 at a flow rate of 20 ml/minute. The concentrations of the emulsified oil in the treated water sampled from the downstream of the column-1 and that of the column-2 measured by a turbidimeter were 90 ppm and 0 ppm respectively.

EXAMPLE 19

A commercial rayon web (3 denier×51 mm) weighing 2.5 grams was dipped in the methylene chloride solution containing 10% of distearylamine and 1% of polystyrene for 1 minute, and after the light squeezing of the web, the solvent was evaporated to dryness and 5.0 grams of fibrous composite was obtained.

The composite was wholly packed into a column having a diameter of 14 mm (hereinafter called column-1), and 5.0 grams of "Olsorb" (trade name), a nonwoven oil adsorbing material composed of a laminate of polypropylene nonwoven web and polystyrene nonwoven web, was packed into another column having a diameter of 14 mm (hereinafter called column-2).

Water containing 100 ppm of cutting oil ("KUTWELL 40"; product of Esso Petroleum Oil Co.,Ltd.) was passed through in the order of column-1 and column-2 at a flow rate of 20 ml/minute. The concentration of the emulsified oil in water sampled from the downstream of the column-1 was 80 ppm, while that of the column-2 was 0 ppm.

EXAMPLE 20

A fibrous material of polypropylene having net-like fibrous structure was prepared by the process described in Example 1.

Two grams of the fibrous material of polypropylene was dipped in 40 ml of chloroform solution containing 2.0 grams of benzenesulfonyl-N-stearylamide synthesized from benzene sulfonyl chloride and stearylamine and 0.5 gram of polystyrene as an adhesive. After the complete adsorption of the solution by said fibrous material, the solvent was evaporated to dryness and 4.5 grams of fibrous composite composed of the fibrous substrate and benzenesulfonyl-N-stearylamide adhered thereto was obtained.

The fibrous material (4.5 g.) was packed into a column having a diameter of 14 mm, and water containing 100 ppm of machine oil and 20 ppm of polyoxyethylene-nonylphenol ether (n=10) in the form of emulsion having oil droplets whose diameter ranging between 1 and 10μ, was poured into the column at a flow rate of 10 ml/minute (SV≈30). The concentration of the emulsified oil in the effluent from the column was measured by the turbidimeter made in Nippon Seimitsu Kogaku Co., Ltd. and the following results were obtained.

TABLE 11

| Amount treated (l) | Oil Concentration of treated water (ppm) |
| --- | --- |
| 0-58 | 0.0-1.0 |
| 59-70 | 1.0-2.0 |
| 71-82 | 2.0-5.0 |
| 83-88 | 5.0-10.0 |
| 89-91 | 10.0-20.0 |

EXAMPLE 21

A commercially available polypropylene web (6 denier×70 mm) weighing 2.0 grams was dipped in 40 ml of chloroform solution containing 2.0 grams of methanesulfonyl-N-stearylamide. After the complete adsorption of the solution by said fibrous material, the solvent was evaporated to dryness and 4.0 grams of fibrous composite was obtained.

The composite was wholly packed into a column having a diameter of 14 mm, and water containing 100 ppm of machine oil and 20 ppm of polyoxyethyleneno-nylphenol ether (n=10) in the form of emulsion was poured into the column at a flow rate of 10 ml/minute (SV≈30). The concentration of the emulsified oil in the effluent water from the column was measured by the turbidimeter described in the previous example, and the following results were obtained.

TABLE 12

| Amount treated (l) | Oil Concentration of treated water (ppm) |
| --- | --- |
| 0-55 | 0.0-1.0 |
| 56-65 | 1.0-2.0 |
| 66-78 | 2.0-5.0 |
| 79-85 | 5.0-10.0 |

EXAMPLE 22

Two grams of polyethylene terephthalate web (12 denier×60 mm) was dipped into 40 ml of chloroform solution containing 2.0 grams of p-toluenesulfonyl-N-oleylamide synthesized from p-toluenesulfonyl chloride and oleylamine and 0.5 grams of polystyrene as adhesive at room temperature. After the complete adsorption of solution by said web, the solvent was evaporated to dryness and 4.5 grams of fibrous composite was obtained.

The composite was wholly packed into a column having a diameter of 14 mm, and an emulsion containing 100 ppm of machine oil and 20 ppm of polyoxyethylene laurylether (n=10) is poured into the column at a flow rate of 10 ml/minute (SV≈30). The concentration of the emulsified oil in the effluent water from the column was measured by the above-mentioned turbidimeter, and the following results were obtained.

TABLE 13

| Amount treated (l) | Oil Concentration of treated water (ppm) |
| --- | --- |
| 0-56 | 0.0-1.0 |
| 57-70 | 1.0-2.0 |
| 71-81 | 2.0-5.0 |
| 82-89 | 5.0-10.0 |

EXAMPLE 23

Two grams of "CASHMILON" web (product of Asahi Chemical Co., Ltd.) was dipped into 40 ml of acetone solution containing 2.0 grams of benzenesulfonamide and 0.5 grams of epoxy resin having a molecular weight of about 1400 at room temperature. After the complete adsorption of the solution by said web, the solvent was evaporated to dryness and 4.5 grams of fibrous composite was obtained.

The composite was wholly packed into a column having a diameter of 14 mm, and an emulsion containing 100 ppm of soybean oil and 20 ppm of stearic acid monoglyceride was poured into the column at a flow rate of 10 ml/minute. The concentration of the emulsified oil in the effluent from the column was measured by the above-mentioned turbidimeter; however, no turbidity was observed.

EXAMPLE 24

A commercially available rayon web (2 denier×51 mm), 2.0 grams in weight, was dipped into 40 ml of acetone solution containing 2.0 grams of p-toluenesulfonhydrazide. After the complete adsorption of the solution by said web, the solvent was evaporated to dryness and 4.0 grams of fibrous composite was obtained.

The composite was wholly packed into a column having a diameter of 14 mm, and an emulsion containing 100 ppm of machine oil and 20 ppm of sorbitan monostearate was poured into the column at a flow rate of 10 ml/minute. The concentration of the emulsified oil in the effluent water from the column was measured by the above-mentioned turbidimeter; however, no turbidity was observed showing the concentration of 0 ppm.

EXAMPLE 25

A fibrous material of polypropylene having net-like fibrous structure prepared by the process described in the Example 20 was dipped in 40 ml of methylene chloride solution containing 2.0 grams of p-toluenesulfonyl-N-butylamide and 0.5 grams of polystyrene at room temperature. After the complete adsorption of the solution by said fibrous material, the solvent was evaporated to dryness and 4.5 grams of fibrous composite was obtained.

The composite was wholly packed into a column having a diameter of 14 mm, and an emulsion containing 100 ppm of heavy oil and 20 ppm of polyethylene glycol monostearate (n=10) was charged at the top of the column at a flow rate of 10 ml/minute (SV≈30). The concentration of the effluent water from the column was measured by the above-mentioned turbidimeter, and the following results were obtained.

TABLE 14

| Amount treated (l) | Oil Concentration of treated water (ppm) |
| --- | --- |
| 0–35 | 0.0–1.0 |
| 36–44 | 1.0–2.0 |
| 45–62 | 2.0–5.0 |
| 63–70 | 5.0–10.0 |

EXAMPLE 26

A commercially available polypropylene web (6 denier×70 mm) weighing 2.0 grams was dipped into 30 ml of acetone solution containing 3.0 grams of p-tert-octylphenol and 0.5 gram of epoxy resin having a molecular weight of 1500 at room temperature. After the complete adsorption of the solution by said fibrous material, the solvent was evaporated to dryness and 5.5 grams of fibrous composite was obtained.

The composite was wholly packed into a column having a diameter of 14 mm and an emulsion containing 100 ppm of machine oil and 20 ppm of polyoxyethylenenonylphenol ether (n=10) was poured into the column at a flow rate of 10 ml/minute (SV≈25).

The concentration of the effluent water from the column was measured by the above-mentioned turbidimeter, and the following results were obtained.

TABLE 15

| Amount treated (l) | Oil Concentration of prepared water (ppm) |
| --- | --- |
| 0–45 | 0.0–1.0 |
| 46–58 | 1.0–2.0 |
| 59–72 | 2.0–5.0 |
| 73–98 | 5.0–10.0 |

EXAMPLE 27

Two grams of commercially available polypropylene web (6 denier×70 mm) was dipped into 30 ml of acetone solution containing 3.0 grams of 3,5-dibutyl-4-hydroxytoluene and 0.5 gram of epoxy resin having a molecular weight of 1500 at room temperature. After the complete adsorption of the solution by said fibrous material the solvent was evaporated to dryness and 5.3 grams of fibrous composite was obtained.

The composite was wholly packed into a column having a diameter of 14 mm and an emulsion containing 100 ppm of machine oil and 20 ppm of polyoxyethylenenonylphenol ether (n=10) was poured into the column at a flow rate of 10 ml/minute (SV≈25).

The concentration of the effluent water from the column was measured by the above-mentioned turbidimeter and the following results were obtained.

TABLE 16

| Amount treated (l) | Oil Concentration of treated water (ppm) |
| --- | --- |
| 0–40 | 0.0–1.0 |
| 41–55 | 1.0–2.0 |
| 56–67 | 2.0–5.0 |
| 68–85 | 5.0–10.0 |

EXAMPLE 28

Two grams of commercially available polypropylene web (6 denier×70 mm) was dipped into 30 ml of acetone solution containing 2.0 grams of (2-hydroxypropyl)stearate and 0.5 gram of polystyrene at room temperature. After the complete adsorption of the solution by said fibrous material, the solvent was evaporated to dryness and 4.2 grams of fibrous composite was obtained.

The composite was wholly packed into a column having a diameter of 14 mm and the compressor drain containing 100 ppm of oil was poured into the column at a flow rate of 10 ml/minute (SV≈30).

The concentration of the effluent water from the column was measured by the above-mentioned turbidimeter and the following results were obtained.

TABLE 17

| Amount treated (l) | Oil Concentration of treated water (ppm) |
| --- | --- |
| 0–20 | 0.0–1.0 |
| 21–30 | 1.0–2.0 |
| 31–44 | 2.0–5.0 |
| 45–60 | 5.0–10.0 |

EXAMPLE 29

Two grams of commercial polypropylene web (6 denier×70 mm) was dipped into 30 ml of acetone solution containing 2.0 grams of stearyl mercaptan and 0.5 gram of polystyrene at room temperature. After the complete adsorption of the solution into said fibrous material, the solvent was evaporated to dryness and 4.2 grams of fibrous composite was obtained.

The composite was wholly packed into a column having a diameter of 14 mm and an emulsion containing 100 ppm of machine oil and 20 ppm of polyoxyethylenenonylphenol ether (n=10) was poured into the column at a flow rate of 10 ml/minute (SV≈30).

The concentration of the effluent water from the column was measured by the above-mentioned turbidimeter, and the following results were obtained.

TABLE 18

| Amount treated (l) | Oil Concentration of treated water (ppm) |
| --- | --- |
| 0–32 | 0.0–1.0 |
| 33–45 | 1.0–2.0 |
| 46–62 | 2.0–5.0 |
| 63–80 | 5.0–10.0 |

EXAMPLE 30

Commercially available rayon web (3 denier×51 mm) was dipped into 40 ml of chloroform solution containing 2.0 grams of N-phenyl carbamic acid stearyl ester (stearyl N-phenyl carbamate) synthesized from phenyl isocyanate and stearyl alcohol and 0.5 gram of polystyrene at room temperature. After the complete adsorption of the solution into said fibrous material, the solvent was evaporated to dryness and 4.4 grams of fibrous composite was obtained.

The composite was wholly packed into a column having a diameter of 14 mm and compressor drain containing 100 ppm of oil was poured into the column at a flow rate of 10 ml/minute (SV≈30).

The concentration of the effluent water from the column was measured by the above-mentioned turbidimeter, and the following results were obtained.

TABLE 19

| Amount treated (l) | Oil Concentration of treated water (ppm) |
|---|---|
| 0–42 | 0.0–1.0 |
| 43–65 | 1.0–2.0 |
| 66–82 | 2.0–5.0 |
| 83–108 | 5.0–10.0 |

EXAMPLE 31

Two grams of commercially available polypropylene web (6 denier × 70 mm) was dipped into 40 ml of methylene chloride solution containing 2.0 grams of N-phenyl-N'-stearylthiourea synthesized from phenyl isothiocyanate and stearylamine and 0.5 gram of polystyrene at room temperature. After the complete adsorption of the solution by said fibrous material, the solvent was evaporated to dryness and 4.3 grams of fibrous composite was obtained.

The composite was wholly packed into a column having a diameter of 14 mm and an emulsion containing 100 ppm of machine oil and 20 ppm of polyoxyethylene nonylphenolether (n=10) was poured into the column at a flow rate of 10 ml/minute (SV≈20).

The concentration of the effluent water from the column was measured by the above-mentioned turbidimeter and the following results were obtained.

TABLE 20

| Amount treated (l) | Oil Concentration of treated water (ppm) |
|---|---|
| 0–90 | 0.0–1.0 |
| 91–98 | 1.0–2.0 |
| 99–120 | 2.0–5.0 |
| 121–145 | 5.0–10.0 |

EXAMPLE 32

Two grams of commercially available polypropylene web (6 denier × 70 mm) was dipped in 30 ml of acetone solution containing 2.0 grams of tristearylamine and 0.5 gram of polystyrene at room temperature. After the complete adsorption of the solution by said fibrous material, the solvent was evaporated to dryness and 4.2 grams of fibrous material was obtained.

The total amount of said composite material was packed in a column having a diameter of 14 mm and an emulsion containing 100 ppm of cutting oil ("KUTWELL 40" made by ESSO Petroleum Oil Co. Ltd.) was passed through the column from the top at a flow rate of 10 ml/minute (SV≈30).

The concentration of the effluent water from the column was measured by the above-mentioned turbidimeter, and the following results were obtained.

TABLE 21

| Amount treated (l) | Oil Concentration of treated water (ppm) |
|---|---|
| 0–15 | 0.0–1.0 |
| 16–28 | 1.0–2.0 |
| 29–39 | 2.0–5.0 |
| 40–52 | 5.0–10.0 |

EXAMPLE 33

Two grams of commercially available rayon web (6 denier × 70 mm) was dipped in 30 ml of acetone solution containing 2.0 grams of methanesulfonyl-N-octyl amide synthesized from methanesulfonyl chloride and 2-methylhexylamine, and 0.5 gram of an epoxy resin having a molecular weight of 1,500 at room temperature.

After the complete adsorption of the solution by said fibrous material, the solvent was evaporated to dryness and 4.5 grams of fibrous material was obtained.

The total amount of said composite material was packed into a column having a diameter of 14 mm and an emulsion containing 100 ppm of machine oil and polyoxyethylenenonylphenol ether (n=10) was passed through the column from the top at a flow rate of 10 ml/minute (SV≈30).

The oil concentration of the effluent water from the column was measured by the above-mentioned turbidimeter, and the following results are obtained.

TABLE 22

| Amount treated (l) | Oil Concentration of treated water (ppm) |
|---|---|
| 0–20 | 0.0–1.0 |
| 21–28 | 1.0–2.0 |
| 29–35 | 2.0–5.0 |
| 36–50 | 5.0–10.0 |

COMPARATIVE EXAMPLE 2

Two grams of commercially available rayon web (3 denier × 51 mm) was dipped in 30 ml of methylene chloride solution containing 2.0 grams of n-amylamine and 0.5 gram of polystyrene as an adhesive at room temperature. After the complete adsorption of the solution by said fibrous material, the solvent was evaporated to dryness and 4.3 grams of fibrous composite material was obtained.

The total amount of said composite material was packed into a column having a diameter of 14 mm and an emulsion containing 100 ppm of cutting oil ("KUTWELL 40" made by ESSO Petroleum Oil Co., Ltd.) was passed through the column from the top at a flow rate of 10 ml/minute (SV≈30).

The concentration of the effluent water from the column measured by the above-mentioned turbidimeter was 280 ppm, and the emulsion breaking effect was found to be very little.

What we claim is:

1. An emulsion breaking material comprising a substrate and one or more water-insoluble organic compounds physically bound thereto without chemical bonding composed of (A) a hydrophobic part consisting of hydrocarbon groups having a total carbon number of 6 to 60 and (B) a hydrophilic part consisting of at least one functional group selected from the group consisting of amine, imino, sulfonamido, hydrazido, thiourea residue, thiol residue, hydroxyl, carboxyl and urethane.

2. An emulsion breaking material of claim 1 wherein the substrate is fibrous material made of polyamide, polyester, polyolefin, or a polymer of vinyl compound.

3. An emulsion breaking material of claim 1 wherein the substrate is material made of polyolefin.

4. An emulsion breaking material of claim 1 wherein the organic compound is solid at 25° C.

5. An emulsion breaking material of claim 1 wherein the organic compound contains one or more hydrocarbon groups having a total carbon number of 12 to 36 and one or more of at least one functional group selected from the group consisting of amine, imino, sulfonamido, and hydrazido groups.

6. An emulsion breaking material of claim 1 wherein the organic compound contains one or more hydrocarbon groups having a total carbon number of 12 to 36 and one or more of at least one functional group selected from the group consisting of thiourea residue, thiol residue, and sulfonamido group.

7. An emulsion breaking material of claim 1 wherein the organic compound contains one or more hydrocarbon groups having a total carbon number of 12 to 36 and one or more of at least one functional group selected from the group consisting of hydroxyl group, carboxyl group, and urethane group.

8. An emulsion breaking material of claim 4 wherein the organic compound is stearylamine.

9. An emulsion breaking material of claim 2, wherein the substrate is fibrous material made of polyolefin.

10. An emulsion breaking material of claim 1, wherein said substrate is a water-insoluble inorganic material.

11. An emulsion breaking material of claim 1, wherein said substrate is a water-insoluble organic material.

12. An emulsion breaking material of claim 1, wherein said organic compound is bound to said substrate by contacting a solution of said organic compound in a solvent with the substrate and evaporating the solvent to dryness.

13. An emulsion breaking material of claim 1, wherein said functional group contains at least one nitrogen atom.

14. An emulsion breaking material of claim 1, wherein said functional group contains at least one sulfur atom.

15. An emulsion breaking material of claim 1, wherein said functional group contains at least one oxygen atom.

16. An emulsion breaking material of claim 1, wherein said hydrophobic part and said hydrophilic part are balanced in said organic compound to jointly produce an emulsion breaking effect.

* * * * *